Aug. 30, 1927.

B. G. LAMME 1,640,549

GYROSCOPIC STABILIZER SYSTEM

Filed May 15, 1922

WITNESSES:
Fred E. Williams
O. B. Buchanan

INVENTOR
Benjamin G. Lamme
BY
Cleesley G. Carr
ATTORNEY

Patented Aug. 30, 1927.

1,640,549

UNITED STATES PATENT OFFICE.

BENJAMIN G. LAMME, OF PITTSBURGH, PENNSYLVANIA, ASSIGNOR TO WESTINGHOUSE ELECTRIC & MANUFACTURING COMPANY, A CORPORATION OF PENNSYLVANIA.

GYROSCOPIC STABILIZER SYSTEM.

Application filed May 15, 1922. Serial No. 561,181.

My invention relates to gyroscopic stabilizing systems for limiting or preventing the rocking motion of vessels and it has particular relation to methods and apparatus for controlling the precession thereof.

In my copending application Serial No. 149,567, filed February 19, 1917, patented May 16, 1922, No. 1,416,038, for driving systems for gyroscopic stabilizers, is shown a gyroscopic stabilizer system utilizing the flywheel of the gyroscope to equalize the total energy of the system over a complete cycle of operation.

My present application relates to a similar system in which a precession motor is employed which is susceptible of regenerative operation and in which the motor is so operated to limit the speed of precession.

An object of my invention is to provide a system, of the class referred to, wherein energy from the waves or from the rocking motion of the vessel is regenerated through the precession motors.

A further object of my invention is to provide a simple control system whereby the entire stabilizing operation may be automatically accomplished with a minimum amount of apparatus.

Figure 1:
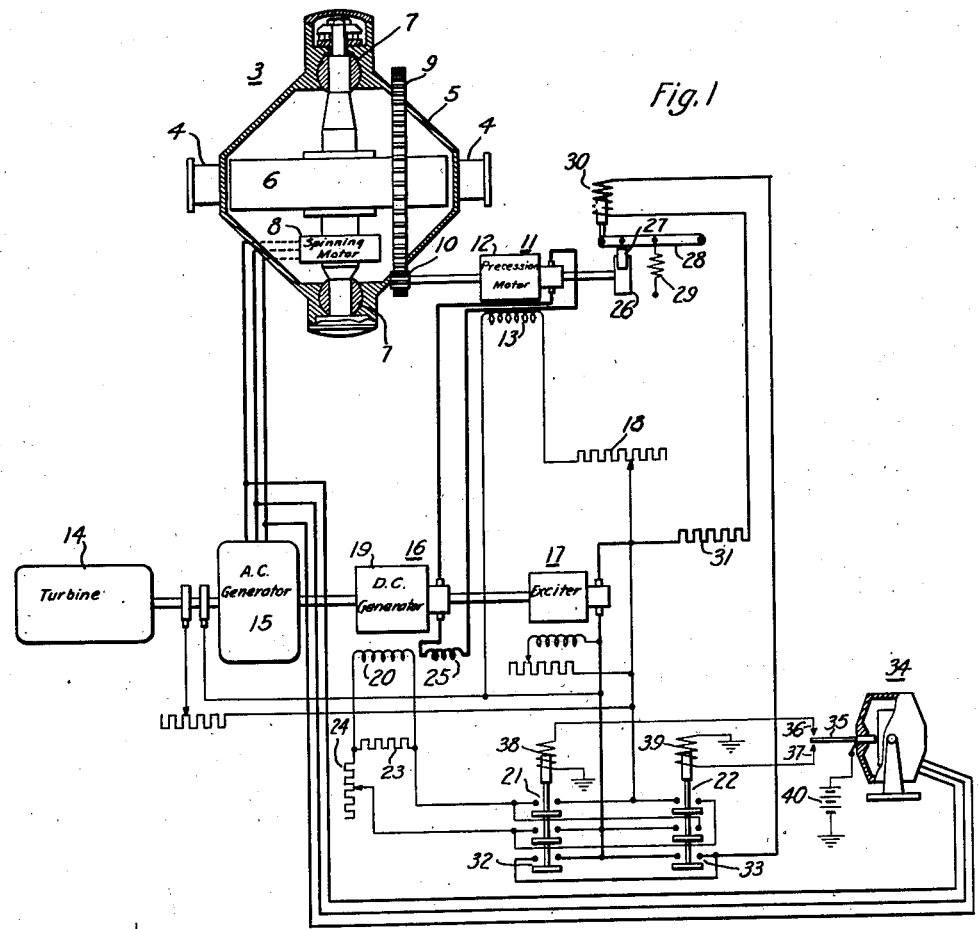
Figure 2:
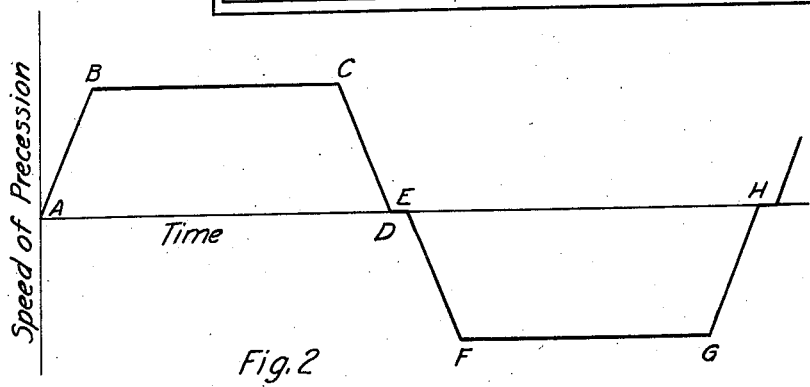

With these and other objects in view, my invention consists in the details of construction and in the methods of manipulation described in the following specification and claims, and illustrated in the accompanying drawings, wherein:

Figure 1 is a diagrammatic view of circuits and apparatus embodying my invention in a preferred form, and Fig. 2 is a curve diagram illustrative of the cycle of operation.

In the drawing is shown a gyroscopic stabilizer comprising a main stabilizing gyroscope 3 which is horizontally pivoted on gudgeon bearings 4 disposed athwartship whereby the stabilizing forces may be transmitted to the vessel. The gyroscope comprises further a casing 5, preferably exhausted, in which is mounted a flywheel 6 which is supported in thrust bearings 7 and which is driven by a squirrel-cage spinning motor 8. Connected to the casing 5 is a vertical gear member 9 which is in operative relation to a pinion 10 mounted on the shaft of a precession motor 11 having an armature 12 and a field-magnet winding 13.

The generating plant comprises a turbine or other prime mover 14 driving an alternating-current generator 15 which supplies power to the spinning motor 8, a direct-current generator 16 which supplies power to the precession motor, and an exciter 17.

In normal operation, the gyroscope flywheel 6 is set in motion by the spinning motor 8 and, after it has attained sufficient speed, a stabilizing force is obtained on the gudgeon bearings 4 by precessing the gyroscope in the fore-and-aft direction by means of the precession motor 11. In general, it is desirable to limit the speed of precession to certain fixed values. To this end, it is necessary to provide some means for limiting the speed of precession since, in normal operation, a small amount of rocking of the vessel, say through three or four degrees, will develop a force derived from the waves tending to accelerate the speed of precession.

A desirable cycle of operation, therefore, is indicated in Fig. 2, wherein the speed of precession is plotted against time. During the first period, from A to B, the precession motor will be accelerated to its maximum speed. Thereafter, the speed should remain substantially constant to a point C, at which time deceleration is effected, and a full stop is made at the point D. Brakes are then applied to hold the gyroscope stationary for a short interval DE, at which time the vessel is starting to roll back in the opposite direction. The motor is therefore accelerated in the opposite direction, attaining full speed at point F, maintaining a constant speed for the period FG, and being then decelerated during the period GH, as before.

In order to secure the above-described cycle of operation in apparatus which is thoroughly reliable and free from hunting, I have found it desirable to employ a shunt-wound direct-current precession motor, as shown, the shunt winding 13 being constantly energized, through an adjustable resistor 18, from the exciter 17, as shown. The armature 12 of the precession motor is energized from the armature 19 of the direct-current generator 16 heretofore mentioned.

The field winding 20 of the direct-current generator is connected, through reversing switches 21 and 22, to the terminals of the exciter 17, whereby the direct-current generator may be energized and de-energized in either direction. The field winding 20 of the generator is preferably provided with a shunt resistor 23 for absorbing the stored energy of the winding when the circuit is de-energized. It may also be provided with a series rheostat 24 which may be adjusted to control the output voltage of the generator. In the particular embodiment shown, I have illustrated the generator 16 as being provided also with a series field winding 25 which provides a relatively weak magnetomotive force assisting the shunt winding 20 during the starting period.

With the arrangement just described, the field energization of the precession motor is maintained constant while its armature voltage is varied in magnitude and direction. Under such circumstances, the speed of the precession motor will vary substantially in accordance with the applied armature voltage, and the motor will operate regeneratively if a torque is applied tending to increase the speed thereof.

I have not illustrated any means for gradually building up the voltage of a direct-current generator, during the accelerating periods AB and EF, as it has been found that the magnetic circuits of the field magnets of the generator cause the field flux to build up somewhat sluggishly, thus producing the desired effect of a progressive increase of the generator voltage during the accelerating period. It will be understood, however, that special relays may be employed to short-circuit a part, or the whole, of the rheostat 24 during the accelerating period, if the inherent building up of the voltage of the generator should be so rapid as to cause excessive strains in the equipment.

Mounted on the same shaft as the precession motor is shown diagrammatically a drum member 26 co-operating with a brake shoe 27 illustrated as being carried by a rocking arm 28, said arm being biased toward braking position by means of a spring 29, and the brake being released by an electromagnet 30. The brake-controlling magnet 30 is adapted to be energized from the exciter 17 through a current-limiting resistor 31 and switch contacts 32 and 33 which are carried by the reversing switches 21 and 22. Thus, the brake shoe 27 is moved out of engagement with the drum 26 whenever either one of the switches 21 and 22 are closed to energize the field-magnet winding 20 of the direct-current generator in either direction.

When the generator field-magnet winding 20 is de-energized, the brake magnet 30 is also de-energized and the brake is then applied by the action of the spring 29. In actual operation, there is a certain sluggishness of action incident to the full application of the brake after the de-energization of the magnet 30, owing to the slowness with which the magnetic flux dies down, and this fact is utilized to cause the application of the brake to be delayed until the precession motor has been brought almost to a standstill through regenerative action. If desired, however, any other time delay mechanism could be adopted by those skilled in the art for timing the application of the brake member.

With the apparatus thus described, the entire operation of the gyroscope over a complete cycle may be controlled by the manipulation of the reversing switches 21 and 22 for energizing and de-energizing the shunt field winding of the direct-current generator in one direction or the other. In order to effect automatic operation, I have shown schematically an auxiliary controlling gyroscope 34 carrying a movable contact arm 35 adapted to engage upper and lower stationary contacts 36 and 37, thus energizing switch-actuating solenoids 38 and 39, respectively, for electrically operating the reversing switches 21 and 22. Energy for the actuation of the solenoids 38 and 39 is supplied by means of a battery 40.

In operation, the auxiliary gyroscope 34, or other equivalent apparatus, makes a contact to energize the appropriate switch-operating solenoid upon the incipience of a rocking motion in one direction or the other. Upon the termination of such motion, the switch-actuating solenoid is de-energized. Upon the incipience of a rolling motion in the opposite direction, the other solenoid is energized to cause precession in the opposite direction. The details of the auxiliary controlling apparatus are not illustrated as they form no part of the present invention.

Attention is directed to the fact that the turbine or other prime mover 14 will have a falling speed-torque characteristic. Hence, when the precession motor is accelerating, the turbine, in order to deliver more power, will operate at a lower speed. In like manner, when the precession motor is regenerating, the prime mover will deliver less power and will operate at a higher speed. However, the alternator 15 and the squirrel-cage spinning motor 8, or other equivalent driving means for the flywheel, will hold the prime-mover speed substantially proportional to the flywheel speed within a few percent, by reason of energy-interchanges to and from the flywheel, as will be understood, thus causing the spinning motor to operate regeneratively when the precession motor is accelerating.

An extreme case of a prime mover having a falling speed-torque characteristic is a combination in which the prime mover delivers no torque, or is dispensed with altogether, and this may actually be done if the permissible rolling of the vessel is great enough to derive sufficient energy from the waves, through the regenerative action of the precession motor.

While I have described certain characteristics of my invention in detail, therefore, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. In a control system for a gyroscopic ship stabilizer, the combination including a gyroscope flywheel, a spinning motor therefor, a prime mover having a falling speed-torque characteristic, generating means coupled thereto and connected to said spinning motor, the spinning motor being inherently capable of operating regeneratively and operating normally at a speed which varies substantially in accordance with the speed of the prime mover, a direct-current precession motor having a commutator-type armature and a field-magnet, a direct-current generator coupled to said prime mover and connected to said precession-motor armature, a brake mechanically connected to said precession motor, means adapted to be automatically responsive to the rolling motion of the ship in one direction for releasing the brake and energizing the generator field magnet at the incipience of such motion and for de-energizing the generator field magnet and applying the brake at the end of such motion, means adapted to be automatically responsive to the rolling motion of the ship in the opposite direction for releasing the brake and energizing the generator field magnet in the opposite direction at the incipience of such opposite motion and for de-energizing the generator field magnet and applying the brake at the end of such opposite motion, and means for causing the field magnet of said precession motor to be independently energized.

2. In a control system for a gyroscopic ship stabilizer, the combination including a gyroscope flywheel, a spinning motor therefor, a prime mover having a falling speed-torque characteristic, generating means coupled thereto and connected to said spinning motor, the spinning motor being inherently capable of operating regeneratively and operating normally at a speed which varies substantially in accordance with the speed of the prime mover, a direct-current precession motor having a commutator-type armature and a field-magnet, a direct-current generator coupled to said prime mover and connected to said precession-motor armature, a brake mechanically connected to said precession motor, means adapted to be automatically responsive to the rolling motion of the ship in one direction for releasing the brake and energizing the generator field magnet at the incipience of such motion and for de-energizing the generator field magnet and applying the brake at the end of such motion, means adapted to be automatically responsive to the rolling motion of the ship in the opposite direction for releasing the brake and energizing the generator field magnet in the opposite direction at the incipience of such opposite motion and for de-energizing the generator field magnet and applying the brake at the end of such opposite motion, means for causing the field magnet of said precession motor to be independently energized and means for causing the full application of the brake to be retarded, in each instance, until the speed of the precession motor has been materially reduced by regenerator action.

3. Means for controlling the operation of a gyroscopic stabilizer for a vessel, comprising, in combination, a direct-current precession motor, a generator permanently connected to the armature of said motor, means for driving said generator or for absorbing energy therefrom during regenerative operation, a source of exciting-current energy for said motor and said generator, means for continuously exciting the field windings of said motor from said source, a pair of switches for connecting the field windings of the generator across said source to energize the same in the one direction or the other, means responsive to an incipient oscillation of the vessel for closing the proper one of said switches according to the direction of said incipient oscillation, and means operative at the termination of said oscillation for opening the said one of the switches whereby the generator field windings are suddenly disconnected from said source of exciting-current energy, whereby said motor is brought to a quick regenerative stop during the collapse of the generator field.

In testimony whereof, I have hereunto subscribed my name this 13th day of May, 1922.

BENJAMIN G. LAMME.